United States Patent [19]
Tuvy et al.

[11] Patent Number: 5,978,472
[45] Date of Patent: Nov. 2, 1999

[54] NETWORK INTERFACE DEVICE FOR A BUILDING ENTRANCE TERMINAL

[75] Inventors: Avraham Tuvy, Oakhurst; Anthony L. Nieves, Shark River Hills; James Markey, N. Middletown; Frank Mascetelli, Howell, all of N.J.

[73] Assignee: Antec Corporation, Duluth, Ga.

[21] Appl. No.: 08/964,506

[22] Filed: Nov. 5, 1997

[51] Int. Cl.[6] .............................. H04M 3/00; H04M 1/00
[52] U.S. Cl. ............................................ 379/399; 379/329
[58] Field of Search ...................................... 379/419, 399, 379/327, 328, 329; 455/300; 361/818, 816, 724, 725, 752, 755

[56] References Cited

U.S. PATENT DOCUMENTS

| | | | |
|---|---|---|---|
| 3,816,911 | 6/1974 | Knappenberger | 455/300 |
| 4,560,839 | 12/1985 | Dillard | 379/399 |
| 5,235,638 | 8/1993 | Dondero . | |
| 5,363,440 | 11/1994 | Daoud | 379/399 |
| 5,528,684 | 6/1996 | Schneider et al. | 379/399 |

*Primary Examiner*—Jack Chiang
*Attorney, Agent, or Firm*—William A. Hartsell

[57] ABSTRACT

A telephone network interface device for a building entrance terminal includes a cabinet for housing one or more interface modules. Each interface module is hingedly connected to a rail on the bottom of the cabinet such that the module can be rotated upwardly or downwardly and secured in the cabinet with a special screw. Each interface module has a front face and a back face. The equipment mounted on the front face of the panel constitutes the subscriber equipment and the equipment mounted on the back face constitutes the service provider equipment. When the interface module is rotated upwardly, a walled housing on the back face which contains service provider equipment presses against a foam pad within the cabinet, thus providing an environmental seal to equipment mounted within the housing. When the interface module is rotated upwardly and secured, the front face of the panel with the subscriber equipment is accessible to anyone who opens the cabinet, including the subscriber. When the interface module is unlocked by service provider personnel and the interface module is rotated downwardly, the front face of the panel faces generally downward and the back face of the panel faces generally outward, thus restricting access of the service provider equipment only to service provider personnel.

19 Claims, 4 Drawing Sheets

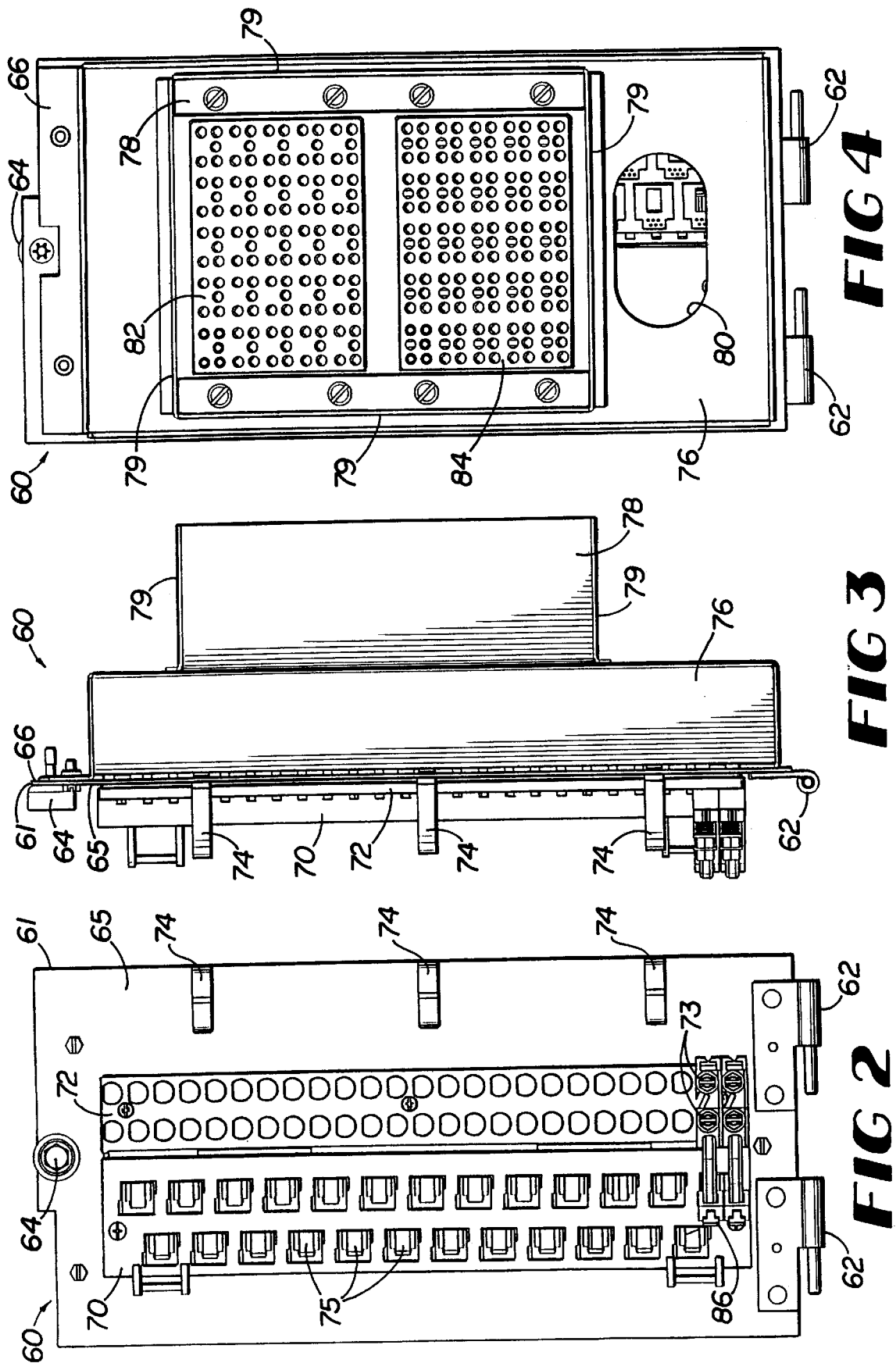

NETWORK INTERFACE DEVICE FOR A BUILDING ENTRANCE TERMINAL

FIELD OF THE INVENTION

The invention relates generally to a telephone network interface device and, more particularly, to an improved telephone network interface device for a building entrance terminal.

BACKGROUND OF THE INVENTION

Telephone subscribers can own their own equipment and connect such equipment to the incoming telephone line of a telephone service provider at a terminal typically connected to the side of the subscriber's dwelling or place of business, hereinafter referred to as the "subscriber building." Thus, the terminal includes a "demarcation point" that is the connection point between the equipment that is accessible to the subscriber (the "subscriber equipment") and equipment that is accessible only to the service provider (the "service provider equipment"). The demarcation point is helpful in fault detection and isolation by easily allowing for the determination of whether a fault exists in the service provider equipment or the subscriber equipment.

Typically, this demarcation point is provided by a telephone network interface device (NID). A conventional NID is housed within a cabinet, typically called a building entrance terminal (BET), having both a service provider compartment and a subscriber compartment for mounting the service provider's and subscriber's equipment, respectively. These separate compartments are accessible through separate doors or covers. This permits the subscriber to have access to the subscriber's equipment to allow the subscriber to test the telephone line at the demarcation point. However, the subscriber does not have access to the service provider compartment.

Typically, NIDs provide a telephone jack for connection to the incoming telephone line from the service provider and a telephone plug for connection to the subscriber telephone line. When the plug is inserted into the jack, a telephone connected to the subscriber telephone line is rendered operable. Should the telephone become inoperable, the telephone plug can be unplugged from the telephone jack, thus providing a demarcation point to permit the plug of an operating telephone to be plugged into the jack to facilitate the determination of whether the fault exists in the service provider equipment or in the subscriber equipment.

Most NIDs accept a relatively small number of incoming telephone lines that are connected to a matching number of subscriber telephone lines. However, typical telephone network systems serve a large variety of subscribers in office buildings, apartment complexes, and the like where it is necessary to connect many incoming telephone lines to many subscriber telephone lines.

Existing BETs do not provide for connections to many different subscriber lines while at the same time making access to the subscriber and service provider compartments easy and convenient. Existing BETs typically provide subscriber and service provider equipment side-by-side on the same surface of a fixed plate. This requires a large amount of surface area on which to mount all of the subscriber and service provider equipment, thus necessitating a large plate in the terminal cabinet. Also, existing BETs that mount service provider equipment on the same surface as subscriber equipment provide for an environmental seal by providing a separate sealed cover for the equipment. A separate cover, of course, is an additional piece that must be opened and closed each time the equipment is accessed, thus making servicing of the equipment more complicated. Furthermore, when multiple BETs are stacked on top of one another when the number of subscriber lines is very large, the number of subscriber lines exiting the BETs is very large and hard to manage. Existing BETs do not provide for an external routing channel in which to route subscriber wires exiting the terminal cabinet.

Therefore, there is a need in the art for a BET that provides for connections to many subscriber lines using a small, compact cabinet such that access to both the subscriber and service provider equipment is quick, simple, and convenient.

SUMMARY OF THE INVENTION

The present invention comprises a building entrance terminal (BET) that provides for the connection of incoming service provider telephone lines to subscriber telephone lines and provides a demarcation point between subscriber equipment and service provider equipment for selectively allowing both the subscriber and the service provider personnel to access the respective equipment. The mounting of the subscriber equipment and service provider equipment on opposite faces of an interface module hingedly connected within the BET of the present invention allows many incoming telephone lines to be connected to subscriber lines while utilizing a cabinet having a smaller footprint than convention BETs.

The present invention comprises a generally rectangular cabinet having a back wall, a top, a bottom, and side walls. Within the cabinet is a splice chamber. Incoming telephone lines are spliced off of an incoming telephone cable in the splice chamber and the incoming lines are connected to at least one interface module in the cabinet. A foam pad, preferably comprised of closed-cell foam, is attached to the back wall of the cabinet.

One or more interface modules are retained within the cabinet. Each interface module is hingedly connected to a rail on the bottom of the cabinet such that the module can be rotated upwardly or downwardly. The interface module, when rotated upwardly, can be releasably secured within the cabinet by fastening a security screw having a specially shaped head that can be opened only with a special tool available to service provider personnel.

Each interface module has a front face and a back face. A NID block and a terminal block are mounted on the front face of the panel on the interface module. The equipment mounted on the front face of the panel constitutes the subscriber equipment.

Two housings are mounted on the back face of the panel of the interface module. The equipment mounted in the housings on the back face of the panel constitutes the service provider equipment. One housing is an open housing with no cover having walls extending away from the back face of the panel.

When the interface module is rotated upwardly and secured within the cabinet, the walls of the housing press into the foam pad attached to the back wall of the cabinet. Thus, an environmental seal is provided to equipment within the housing when the interface module is secured within the cabinet.

When the interface module is rotated upwardly and secured by the security screw, the front face of the panel with the subscriber equipment is accessible to anyone, including the subscriber. When the security screw is unlocked and the interface module is rotated downwardly, the front face of the panel faces generally downward and the back face of the panel faces generally outward. Thus, the present invention allow the subscriber to access to the subscriber equipment on the front face of the panel, but prevents the unauthorized access of the service provider equipment on the back face of the panel. The service provider equipment is accessible only by unlocking the security screw with a special tool available to service provider personnel.

BRIEF DESCRIPTION OF THE DRAWINGS

FIG. 2 is a front view of one of the interface modules illustrated in FIG. 1.

FIG. 3 is a side view of one of the interface modules illustrated in FIG. 1.

FIG. 4 is a rear view of one of the interface modules illustrated in FIG. 1.

DETAILED DESCRIPTION OF THE PREFERRED EMBODIMENTS

The present invention comprises a building entrance terminal that provides for the connection of incoming service provider telephone lines to subscriber telephone lines and provides a demarcation point between subscriber equipment and service provider equipment for selectively allowing both the subscriber and the service provider personnel to access the respective equipment.

Figure 1:
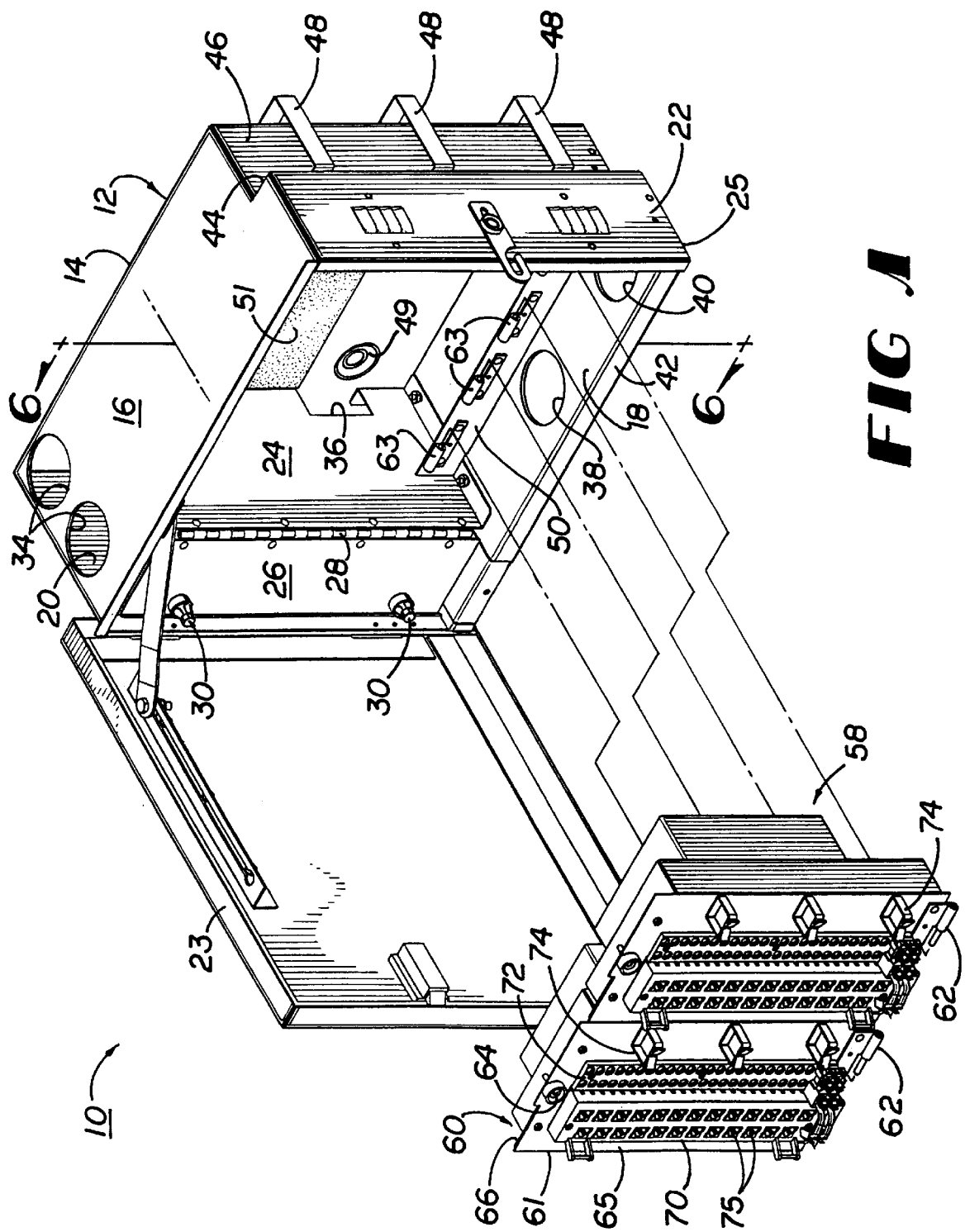
FIG. 1 is a front perspective view of a building entrance terminal constructed in accordance with the present invention.

FIG. 1 shows a building entrance terminal (BET) constructed in accordance with the present invention generally at 10. The BET 10 comprises a generally rectangular cabinet 12 having a back wall 14, a top 16, a bottom 18, and side walls 20 and 22. A cover 23 is hingedly connected to the cabinet to enclose the interior of the cabinet.

Within the cabinet is provided a generally vertical inner wall 24 that extends between the top 16, bottom 18, and back wall 14. Inner wall 24 is oriented generally parallel to side wall 20. The area between the inner wall 24 and the side wall 20 defines a splice chamber. A door 26 is hingedly connected to the inner wall 24 via hinge 28 and is used to close the splice chamber, i.e., the opening between the inner wall 24 and side wall 20. The door 26 is locked by security screws 30 that are attached to connection ports (not shown) on side wall 20. Security screws 30 can be opened only with the aid of a special tool by service provider personnel.

Grommeted or otherwise sealed apertures (not shown) are provided at the bottom of the splice chamber between the bottom 18 and side wall 20. Cable apertures 34 are provided in the top 16 over the splice chamber. An incoming telephone cable from the service provider enters the splice chamber from underneath the cabinet. It will be understood by those skilled in the art that the incoming cable may include a plurality of incoming telephone lines. For example, each incoming cable may include 50 separate incoming telephone lines. A stub cable is spliced to some or all of the separate incoming telephone lines in the splice chamber depending on how many subscriber lines are to be connected with the BET. For example, if 20 subscriber lines are to be connected, then the stub cable is spliced to 20 of the lines in the incoming telephone cable. The stub cable is introduced into the cabinet through cable opening 36 provided in inner wall 24. The lines in the stub cable are connected to the subscriber lines via an interface module, as will be described further below.

The cable opening 36 is shown at the junction of inner wall 24 and back wall 14, however, the opening 36 may be located at any suitable position in the inner wall. If the number of telephone lines required at a location exceeds the number of lines that can be supported by a single BET, multiple BETs can be stacked on top of each other, as described further below with reference to FIG. 7. When BETs are stacked, at least one incoming telephone cable from the service provider enters the splice chamber of the lower BET from underneath the lower BET and exits the lower BET upwardly through sealed apertures 34 in the top of the cabinet. The cable then enters the splice chamber of the upper BET.

Still referring to FIG. 1, grommeted or otherwise sealed cable apertures 38 and 40, through which subscriber lines exit the cabinet, are provided in the bottom 18 of the cabinet. After exiting the cabinet downwardly through apertures 38 and 40, the subscriber lines are routed into the subscriber building.

Side wall 22 has recessed walls 44 and 46 defining a recessed routing channel at the rear of the side wall 22. When multiple BETs are stacked, the subscriber lines that exit from apertures 38 and 40 of the upper BET are routed downwardly through the channel in the lower BET. The subscriber lines are held in place in the channel by straps 48. The subscriber lines then run downwardly and enter the subscriber building along with the subscriber lines from the lower BET.

Mounting dimples 49 are provided on the back wall of the cabinet to allow the BET 10 to be attached to the subscriber's wall via screws, bolts, or other suitable fasteners. The mounting dimples protrude from the back side of back wall 14 of the cabinet to define a small gap between the back wall of the cabinet and the wall of the subscriber building when the BET is mounted.

A foam pad 51, preferably comprised of closed-cell foam, is attached inside the cabinet to the back wall 14. The foam pad provides an environmental seal to equipment provided within the BET when the interface module is secured within the cabinet, as will be discussed below.

An equipment compartment is defined between inner wall 24 and side wall 22. Within the equipment compartment is rail 50, which is attached to the bottom 18 of the cabinet. One or more interface modules are retained within the equipment compartment. In FIG. 1, two interface modules 58 and 60 are shown. For the sake of simplicity, only one interface module 60 will be described herein, but it should be understood that more than one module can be retained within the equipment compartment, as is shown in FIG. 1.

Figure 6:
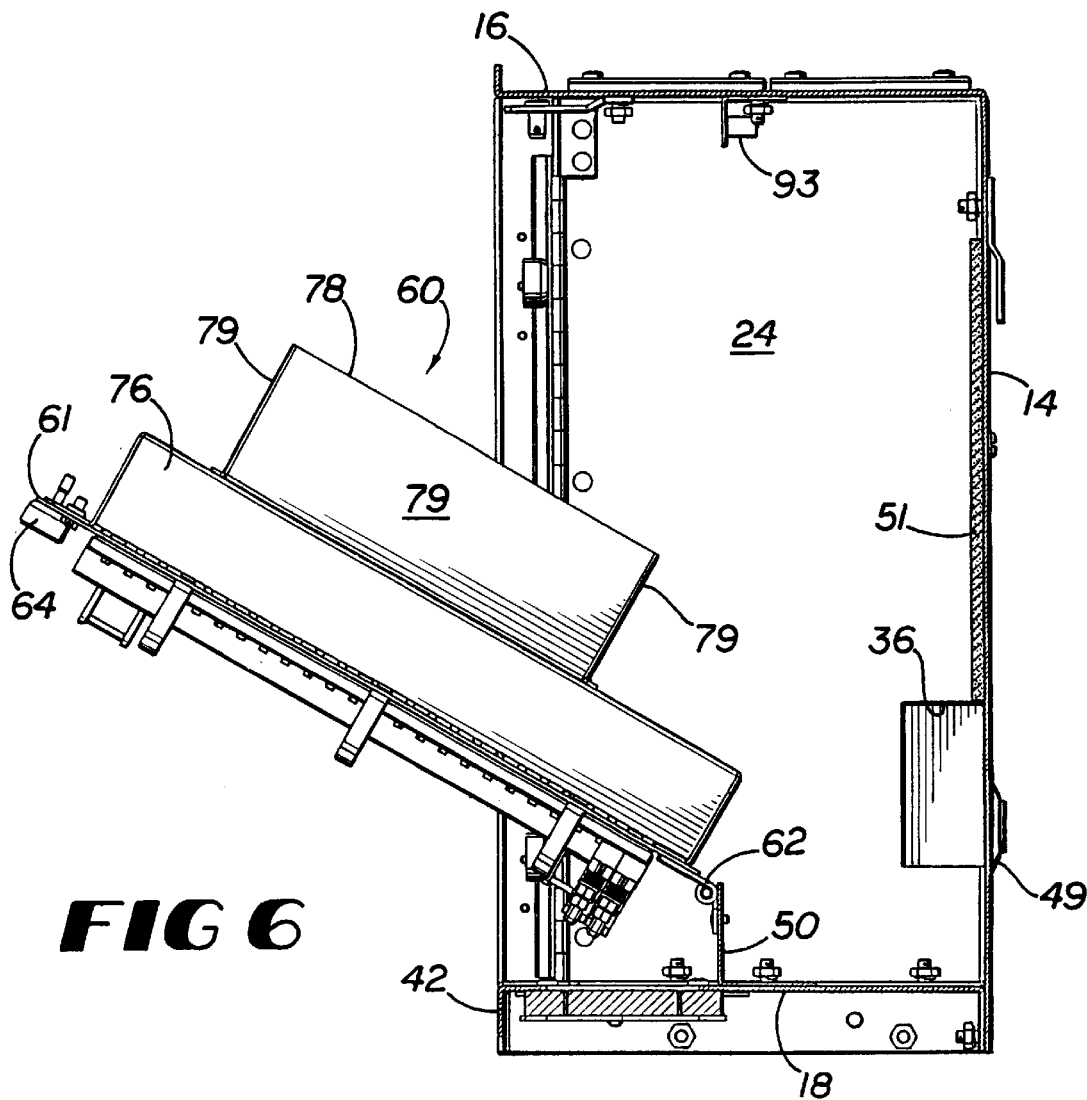
FIG. 6 is a cross-sectional view of the building entrance terminal showing the interface module hingedly mounted within the cabinet, taken along line 6—6 of FIG. 1.

The interface module 60 includes a panel 61. A pair of male half hinges 62 are mounted on the bottom edge of the panel which mate with corresponding female half hinges 63 on rail 50 attached to the bottom of the cabinet. When connected in this manner, interface module 60 is hingedly connected to the rail such that the module can be rotated upwardly or downwardly. The interface module 60, when rotated upwardly, can be releasably secured to a bracket 98 (not shown in FIG. 1) within the cabinet by fastening security screw 64. The bracket 98 is attached to the top 16 of the cabinet, as shown in FIG. 6. Security screw 64 is similar to security screws 30 in that it has a specially shaped head that can be opened only with a special tool. Therefore, only service provider personnel can unlock the interface module to rotate the module downwardly to expose the service provider equipment.

As seen in FIGS. 1–4, the panel 61 of the interface module 60 has a front face 65 and a back face 66. With reference to FIGS. 1 and 2, a NID block 70 and a terminal block 72 are mounted on the front face 65 of the panel of the interface module 60. The preferred implementation shows a NID block 70 and a terminal block 72 that are used to connect up to 25 subscriber telephone lines. With both interface modules 58 and 60 mounted in the cabinet, the BET unit 10 may be used to connect up to 50 subscriber telephone lines. The NID block 70 includes a plurality of jacks 75, each of which is connected to a subscriber telephone line and can be used by the subscriber to test a telephone. The terminal block 72 includes a set of two terminal screws 73 for each subscriber line. Each set of terminal screws 73 is connected to a respective jack 75 by a respective plug 86. Also mounted on the front face of the panel are routing clips 74 for retaining the subscriber lines that run from the terminal screws. The equipment mounted on the front face of the panel constitutes the subscriber equipment.

With reference to FIGS. 3 and 4, housings 76 and 78 are mounted on the back face 66 of the panel 61 of the interface module 60. The equipment mounted on the back face of the panel in housings 76 and 78 constitutes the service provider equipment. It will be appreciated that in the BET of the present invention there is no separate side-by-side compartments for subscriber and service provider equipment within the cabinet. Instead, the present invention mounts subscriber and service provider equipment on the front and back face, respectively, of panel 61. When the interface module is rotated upwardly and locked in position by screw 64, the front face 65 of the panel with the subscriber equipment is accessible to anyone who opens the cabinet, including the subscriber. When the screw is unlocked and the interface module is rotated downwardly, the front face 65 of the panel faces downward and the back face 66 of the panel faces generally outward. Thus, the subscriber has access to the subscriber equipment on the front face of the panel, but the service provider equipment on the back face of the panel is accessible only to service provider personnel who unlock the security screw with a special tool. In this manner, it is easy to make a repair or modification to either the subscriber equipment or the service provider equipment depending upon whether the interface module is rotated upwardly or downwardly, respectively.

Therefore, the present invention houses service provider equipment and subscriber equipment in a cabinet that is not as wide as conventional BETs. It will be understood that the BET of the present invention may be deeper than conventional BETs, and thus extends further from the wall to which the cabinet is mounted. The BET of the present invention is deeper than conventional BETs because the equipment is located on the front and back face of a panel, rather than only facing forward in side-by-side compartments, thus necessitating a deeper cabinet to house the equipment. However, the depth of the cabinet is generally of less concern than its footprint, i.e., its width and height, because of lateral space constraints on the walls of buildings. Therefore, the present invention houses subscriber equipment and service provider equipment while decreasing the footprint of the BET.

As seen in FIGS. 3 and 4, housing 78 extends from housing 76. Housing 78 is an open housing having walls 79 extending from housing 76 with no cover, and contains protector field 82 and electronics field 84. The incoming stub cable, routed to the interface module 60 through cable opening 36, is introduced into housing 76 through port 80. Each incoming telephone line from the stub cable is connected to a respective 5-pin protector in protector field 82 and is then connected to a respective 6-pin test module in electronics field 84. As is well known in the art, each protector acts like a fuse to protect the equipment against electrical power surges and the like, and each test module can be used to test each respective incoming telephone line. It will be understood that FIG. 4 shows 25 5-pin sockets in protector field 82 and 25 6-pin sockets in electronics field 84. Thus, there can be one protector and one test module for each respective incoming telephone line. A single protector and test module can be plugged into each respective socket, or, alternatively, if no protector or test module is desired, a jumper can be connected to the desired sockets.

Each incoming line is then connected to a respective jack 75. Each jack is connected to a respective plug 86, and each plug is in turn wired to a respective set of terminal screws for each subscriber line. The connection to each subscriber line occurs at the terminal screws 73 on the terminal block and each subscriber telephone line is then routed downwardly through the routing clips 74.

Figure 5:
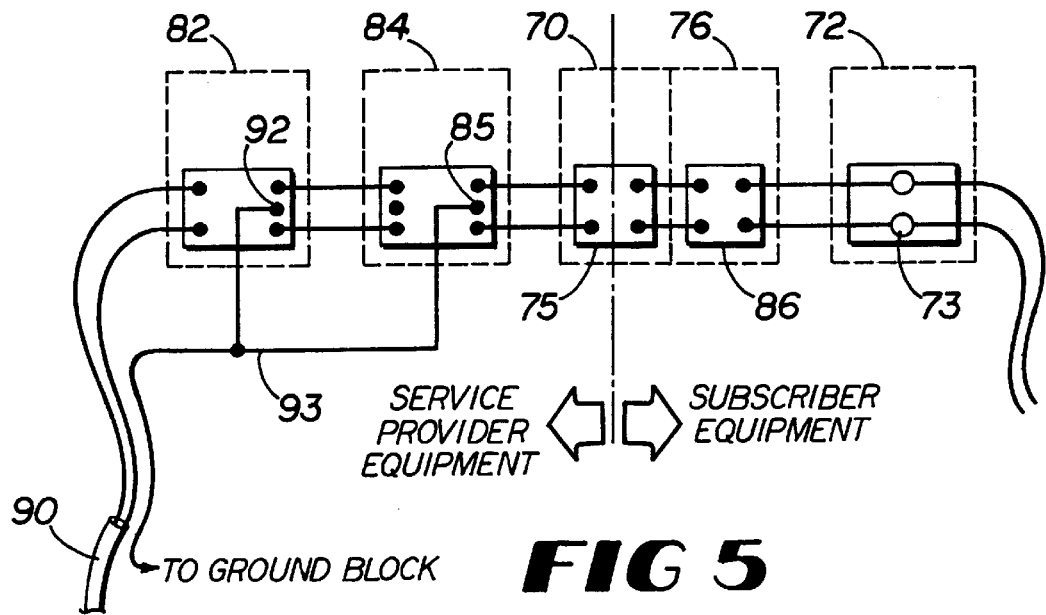
FIG. 5 is a wiring diagram showing the wiring of equipment within the building entrance terminal.

FIG. 5 is a wiring diagram generally showing the connections between the equipment contained within the BET of the present invention. FIG. 5 shows only the wiring for a single incoming telephone line; however, it will be understood that the stub cable may include multiple incoming lines. The incoming line from stub cable 90 is connected to a 5-pin protector in protector field 82. A ground pin 92 on the 5-pin protector is connected to a ground cable 93 which is routed to a ground block in the splice chamber. The line is then connected to a 6-pin test module in electronics field 84. A ground pin 85 in the 6-pin test module is also connected to the ground cable 93.

The incoming telephone line is then connected to connectors on the jack 75 on the back of NID block 70. A plug 86 is connected to the jack 75 on the front of the NID block 70. The plug is then connected to a set of terminal screws 73 on terminal block 72. The wires connected to the terminal screws constitute the subscriber telephone line, which are then routed out of the cabinet. It should be understood that the demarcation point between the service provider equipment and the subscriber equipment is at the jack 75 on NID block 70.

As stated above, housing 78 is not fully enclosed and therefore the equipment within the housing, such as in protector field 82 and electronics field 84, is environmentally exposed. However, an environmental seal is provided to housing 78 by the foam pad 51 on the back wall of the cabinet. This is best described with reference to FIG. 6. When the interface module 60 is rotated upwardly and secured within the cabinet, the walls 79 of housing 78 press into foam pad 51 attached to the back wall. The foam pad provides an environmental seal that protects the components provided in housing 78. When screw 64 is disengaged from bracket 98 and the module 60 is rotated downwardly, the housing walls are moved away from the foam pad, thereby exposing the equipment within the housing. Thus, the need for a separate cover for the housing is eliminated.

The wires for each subscriber line are connected to the terminal screws on the terminal block and are routed through routing clips 74 and through aperture 38 in the bottom of the cabinet. It will be understood that subscriber lines running from the terminal screws on the other interface module 58 exit the cabinet through aperture 40, as shown in FIG. 1.

Figure 7A:
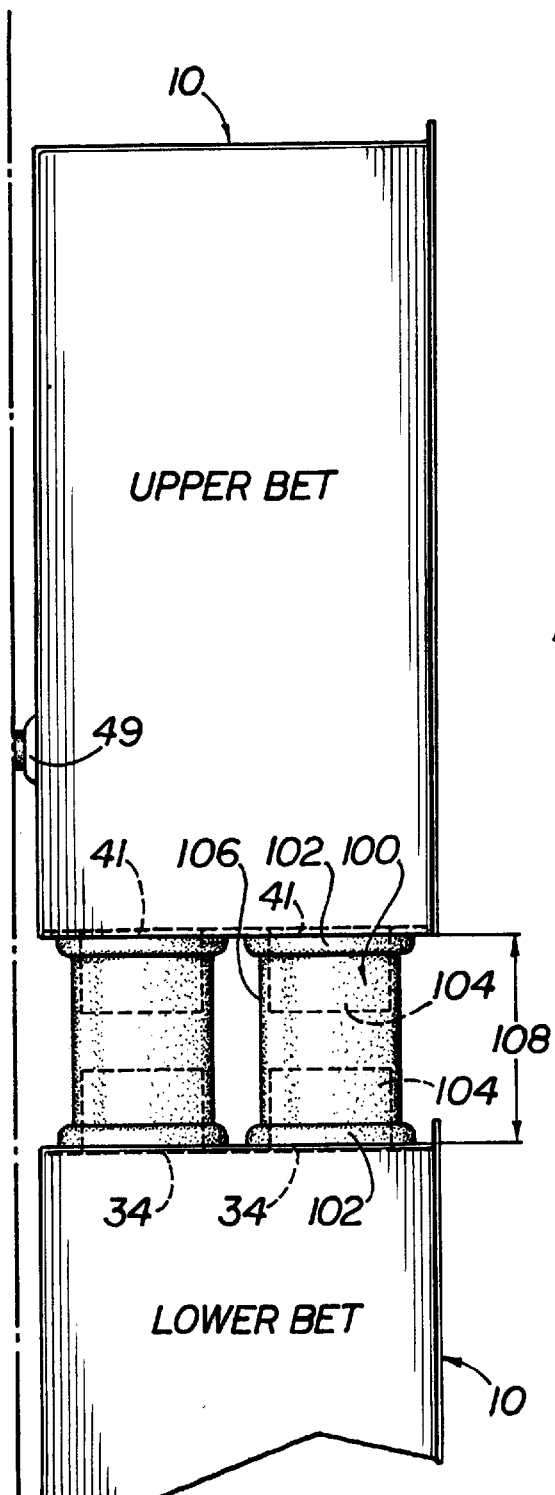
FIG. 7A is a side view of two stacked building entrance terminals showing the stacking adapters.
Figure 7B:
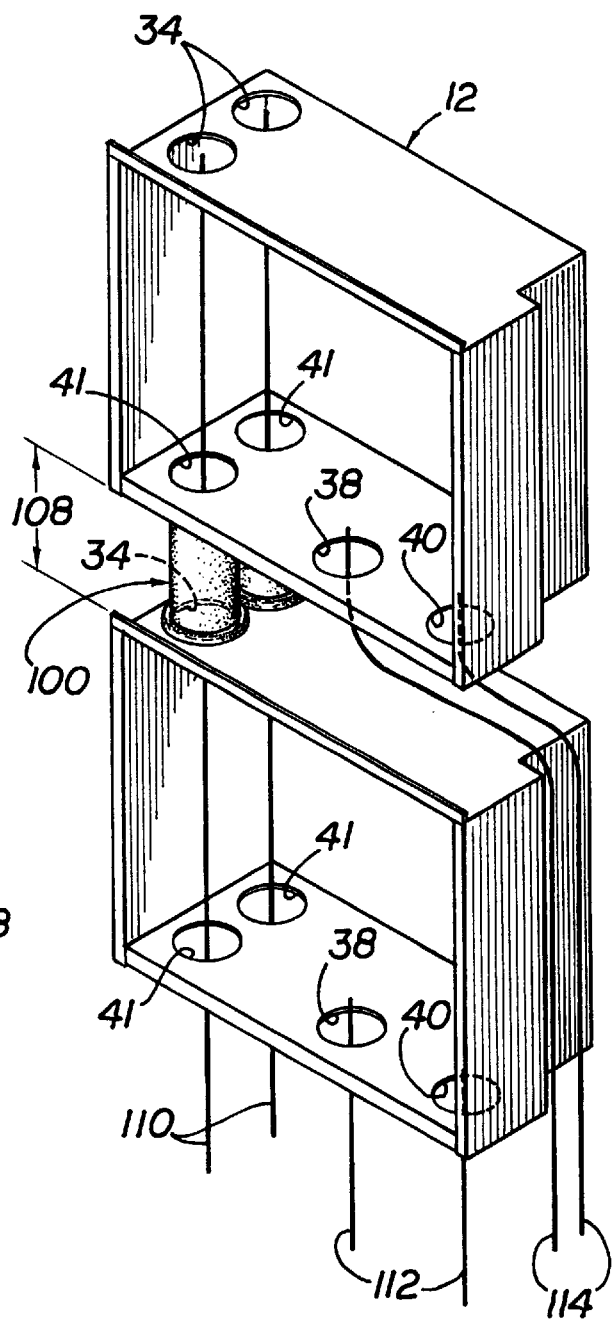
FIG. 7B is a perspective view of the two building entrance shown in FIG. 7A.

FIGS. 7A and 7B show how multiple BETs can be stacked on top of each other, as may be required when the number of telephone lines required at a subscriber location exceeds the number of lines that can be supported by a single BET. When BETs are stacked, as shown in FIG. 7A, a gap 108 is defined between the bottom of the upper BET and the top of the lower BET. The gap is provided by the stacking adapters on the upper and lower BETs, as will be described more fully below.

The use of stacking adapters to stack multiple BETs is shown in FIG. 7A. Two stacking adapters are connected to the top of the lower BET and two stacking adapters are connected to the sealed apertures at the bottom of the splice chamber of the upper BET. Each stacking adapter 100 includes a flange 102 and a short pipe portion 104 connected to the flange. An opening is provided in the flange that coincides with the opening in the pipe portion. The flange of a stacking adapter is connected to the top of the lower BET, preferably by screws or other suitable fasteners, over each of the cable apertures 34 with the pipe portion facing toward the upper BET. Similarly, the flange of a stacking adapter is connected to the bottom of each of the sealed apertures 41 at the bottom of the splice chamber of the upper BET with the pipe portion facing toward the lower BET. It will be understood that the stacking adapters connected to the upper and lower BETs have the same longitudinal axis, thus allowing an incoming telephone cable to be routed through each opposing pair of stacking adapters. A rubber sleeve 106 is then placed over the pipe portions of the opposing pair of stacking adapters. The rubber sleeve 106 is of a type that shrinks onto the pipe portions after it is installed over the pipe portions, and therefore the rubber sleeve provides the necessary support to hold the stacking adapters in the orientation shown in FIG. 7A. The orientation of the stacking adapters, as held in place by the rubber sleeve, is such that a gap 108 is provided between the upper and lower BETs when stacked. Preferably, the gap is approximately 4 inches wide.

As shown in FIG. 7B, at least one incoming telephone cable 110 from the service provider enters the splice chamber of the lower BET through at least one of the sealed apertures 41 provided at the bottom of the splice chamber. For the sake of simplicity, the BETs in FIG. 7B do not include all of the features of the BET of the present invention. One or both of the cables 110 may then exit the lower BET upwardly through cable apertures 34 in the top of the cabinet. The cable then enters the splice chamber of the upper BET through sealed apertures 41. The upper and lower BETs are stacking with stacking adapters, generally shown at 100. As will be understood from the description above, subscriber lines 112 exit the lower BET downwardly through apertures 38 and 40. These subscriber lines then enter the subscriber building.

Similarly, subscriber lines 114 from the upper BET exit through apertures 38 and 40 of the upper BET. However, because the upper BET is stacked on the lower BET, the subscriber lines cannot be run directly downward. Instead, the subscriber lines exiting the upper BET are routed through the gap toward the routing channel of the lower BET. The subscriber lines then run downwardly through the routing channel where they are held in place by straps 48 (not shown). The subscriber lines then exit the routing channel and enter the subscriber building.

The present invention provides numerous advantages over prior art devices. The advantages include the hinged connection of the interface modules to the cabinet which provides subscriber equipment on the front face 65 of panel 61 and service provider equipment on the back face 66 of panel 61. This allows a subscriber to have access to the jacks 75 on the front face of the panel, yet restricts access to the service provider equipment to telephone service provider personnel who unlock the panel and rotate the module downwardly to access the service provider equipment in housings 76 and 78 on the back face of the panel. Also, the foam pad attached to the back wall of the cabinet provides an environmental seal for the equipment within housing 78 when the module is rotated upwardly, which eliminates the need for a separate cover thereby simplifying the construction and servicing of the terminal. Additionally, cabinets can be stacked on top of each other using stacking adapters, and the routing channel provided on side wall 22 allows the subscriber lines exiting the upper terminal to be conveniently retained within the channel of the lower unit, thus simplifying and organizing the often confusing combination of wires exiting the cabinet.

While the preferred embodiments of the invention have been shown and described, it will be obvious to those skilled in the art that various modifications and alterations can be made thereto without departing from the spirit and scope of the invention as defined in the appended claims.

What is claimed is:

1. A building entrance terminal for connecting at least one subscriber telephone line to at least one service provider telephone line, said terminal comprising:

a cabinet having at least a bottom, said bottom having a rear edge and a front edge;

a member connected to said cabinet, wherein said member supports a hinge, said hinge being located between the front edge and the rear edge of said bottom or said cabinet;

an interface module having a front face and a back face, wherein subscriber equipment is mounted on said front face and service provider equipment is mounted on said back face; and wherein said interface module is hingedly connected to said hinge on said member in said cabinet.

2. The terminal as set forth in claim 1 further comprising a means for releasably securing said interface module within said cabinet, wherein when said interface module is secured within said cabinet, said subscriber equipment on said first face of said interface module faces generally outwardly.

3. The terminal as set forth in claim 2 wherein said securing means comprises a security screw having a specially shaped head such that said screw can be secured and released only with a special tool.

4. The terminal as set forth in claim 1 wherein said cabinet further comprises a back wall, and said interface module further comprises a walled housing having no cover, within which is contained said service provider equipment, wherein a foam pad is mounted on said back wall of said cabinet, and wherein when said interface module is rotated into said cabinet, the walls of said housing are pressed against said foam pad to provide an environmental seal.

5. The terminal as set forth in claim 1 wherein said subscriber equipment comprises:

a NID block for providing at least one demarcation point between at least one subscriber telephone line and at least one incoming service provider telephone line; and a terminal block for connecting each subscriber telephone line to each incoming service provider telephone line.

6. The terminal as set forth in claim 1 wherein said service provider equipment comprises at least one protector connected to each incoming service provider telephone line.

7. The terminal as set forth in claim 1 wherein said service provider equipment comprises at least one electronic test module connected to each incoming service provider telephone line.

8. The terminal as set forth in claim 1 wherein the subscriber telephone line connected to said subscriber equipment extends from said back face of said interface module and exits the cabinet through an aperture in said bottom of said cabinet.

9. The terminal as set forth in claim 8 wherein said cabinet also includes a top, at least one side wall, and an external routing channel extending along said side wall of said cabinet for routing at least one subscriber telephone line.

10. The terminal as set forth in claim 9 further comprising:

a stacking adapter connected between the top of said terminal and the bottom of a second terminal to allow the second terminal to be stacked above said terminal;

wherein said stacking adapter causes a gap to be defined between the top of said terminal and the bottom of the second terminal; and wherein at least one subscriber telephone line exiting through an aperture in the bottom of said second terminal is routed through the gap and downwardly through said external routing channel of said terminal.

11. The terminal as set forth in claim 1 wherein said hinge is located above said bottom of said cabinet.

12. The terminal as set forth in claim 1 wherein said interface module has a lower edge, and wherein said interface module has a hinge near said lower edge that is cooperatively connected to said hinge on said member connected to said cabinet.

13. The terminal as set forth in claim 1 wherein said cabinet further includes a splice chamber for introducing a plurality of incoming service provider telephone lines into said cabinet.

14. The terminal as set forth in claim 1 wherein the location of said hinge in the cabinet permits said interface module to be rotated downwardly only a predetermined rotational distance until the front face of said interface module contacts the bottom of said cabinet.

15. The terminal as set forth in claim 1 wherein the connection between at least one service provider telephone line and at least one subscriber telephone line is made on said interface module.

16. The terminal as set forth in claim 1 wherein said member is connected to and extends upwardly from the bottom of said cabinet.

17. The terminal as set forth in claim 1 wherein said member is connected to said bottom of said cabinet at a location between said front edge and said rear edge of said bottom.

18. The terminal as set forth in claim 1 wherein said member is connected to said bottom of said cabinet at a location that is approximately halfway between said front edge and said rear edge of said bottom.

19. The terminal as set forth in claim 1 wherein when said interface module is rotated, said service provider equipment on said second face of said interface module faces generally outwardly and upwardly.

* * * * *